United States Patent Office 3,642,764
Patented Feb. 15, 1972

3,642,764
DISAZO DYESTUFFS
René de Montmollin, Riehen, Gerd Hoelzle, Liestal, and Hans-Joerg Angliker and Richard Peter, Basel, Switzerland, assignors to Ciba Limited, Basel, Switzerland
No Drawing. Filed Aug. 20, 1968, Ser. No. 753,901
Claims priority, application Switzerland, Aug. 25, 1967, 11,938/67; July 17, 1968, 10,745/68
Int. Cl. C09b 35/24, 35/28, 62/08
U.S. Cl. 260—153   17 Claims

ABSTRACT OF THE DISCLOSURE

Disazo or polyazo dyestuffs, in which two of the same or different azo dyestuff residues of the general formula (II)
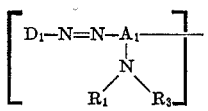

or (III)
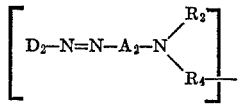

are linked through a divalent bridge member Z, in which formulae $R_1$, $R_2$ and $R_3$ each represents a hydrogen atom or preferably a low-molecular alkyl group, which may be linked with the residue $A_1$ or $A_2$ in the ortho-position to the group —$NR_1R_3$ or —$NR_2R_4$ to form a ring; $R_4$ represents a low-molecular alkylene group; $A_1$ and $A_2$ each represents a benzene or naphthalene residue. The dyestuffs are suitable for dyeing and printing materials of animal origin, polyamide fibers, polyurethanes and other such materials. The dyestuffs exhibit excellent light and wet fastness.

---

The present invention provides new, valuable disazo or polyazo dystuffs in which two azo dyestuff molecules, which may contain fibre-reactive groups, of the general type (I)
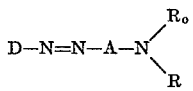

(where D represents the residue of a diazo component containing at least one strongly acidic group imparting solubility in water and if desired azo groups, A represents the residue of a coupling component of the benzene or naphthalene series containing the amino group in the para-position to the azo group, $R_o$ and R each represents a hydrogen atom or an alkyl or aralkyl residue which may be substituted) are linked through their coupling components by a divalent bridge Z (having no dyestuff characteristics), which is bound either through the residues $R_o$ and/or R or directly to the residues of the coupling components. A fibre-reactive mono- or dichloro-triazine residue or a fibre-reactive aliphatic carboxylic acid residue containing not more than 3 carbon atoms, such as chloroacetyl, dibromopropionyl, acryl, bromoacryl or β-sulphatopropionyl residue.

More particularly the present invention provides new disazo or polyazo dyestuffs, in which two of the same or different azo dyestuff residues of the general formula (II)
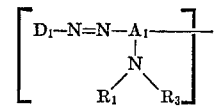

or (III)
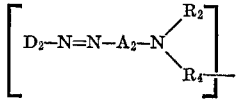

are linked through a divalent bridge member Z, in which formulae $R_1$, $R_2$ and $R_3$ each represents a hydrogen atom or preferably a low-molecular (containing 1 to 4 carbon atoms) substituted or unsubstituted alkyl group, which may be linked with the residue $A_1$ or $A_2$ in the ortho-position to the group —$NR_1R_3$ or —$NR_2R_4$ to form a ring; $R_4$ represents a low-molecular substituted or unsubstituted alkylene group; $A_1$ and $A_2$ each represents a benzene or naphthalene residue in which the azo group and the group —$NR_1R_3$ or —$NR_2R_4$ are attached in the 1,4-position to each other; $D_1$ and $D_2$ each represents the residue of an aromatic or heterocyclic diazo component containing a sulpho group and if desired a fibre-reactive group, and Z represents a divalent bridge having no dyestuff characteristics.

Specially valuable are dyestuffs of the present invention of formulae (IV)
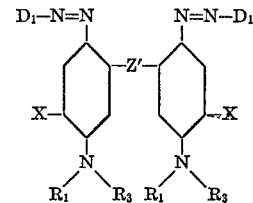

(V)
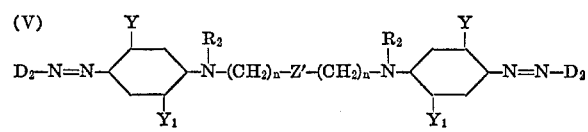

where $D_1$ and $D_2$ each represents the residue of a diazo component of the benzene or naphthalene series containing at least one and not more than three sulpho groups and if desired a fibre-reactive group; X, Y and $Y_1$ each represents hydrogen, trifluoromethyl, alkanesulphonyl, alkyl, alkoxy, aryloxy, halogen or acylamino, such as hydrogen, trifluoromethyl, lower alkanesulphonyl, lower alkyl, lower alkoxy, phenoxy, chlorine, bromine, benzoylamino, or lower alkanoylamino; $R_1$, $R_2$ and $R_3$ each represents hydrogen, alkyl or substituted alkyl; $n=1, 2$ or 3 and Z' represents a bridge member of the formula (VI)    $-X'-(B-Y')_{p-1}-(R')_{q-1}-(Y'-B)_{r-1}-X'-$ where B represents a CO, $SO_2$ or lower alkylene bridge; X' and Y' each represents an oxygen atom or a nitrogen such as —$NR_4$— wherein $R_4$ is hydrogen or lower alkyl (especially an —NH) bridge or a direct linkage, and the two X's or Y's and B may be different from each other; R' represents a substituted or unsubstituted heterocyclic or aromatic residue or an aliphatic residue (alkylene containing 2 to 6 carbon atoms) which may be interrupted by hetero atoms, such as phenylene, toluylene, diphenylene, stilbene or lower alkylene or lower alkylene which is interrupted by oxygen atoms or $NR_4$—; p, q and r may each be equal to 1 or 2, but the sum $p+q+r$ must be at least 4. It is obvious that the residues $D_1$, $D_2$, $R_1$, $R_2$, $R_3$, X, Y and $Y_1$ present on both sides of the bridge member Z' may be different from each other. R' more particularly represents phenylene, toluylene or lower alkylene containing 2 to 6 carbon atoms, and the two B, X', Y', p, q and r are the same, and in which at least one of the residues, $R_2$, $R_1$ and $R_3$ represents ethyl or ethyl substituted in β-position by cyano, hydroxyl, lower acyloxy or by an esterified carboxyl group. Z' more particularly represents —NH—CO—R'—CO—NH— or

—NH—CO—NH—R'—NHCONH—

The new dyestuffs may be obtained for example by either (a) reacting two dyestuffs of the formula (I) 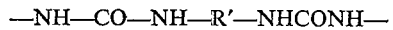

with each other or with a bifunctional compound containing two reactive atoms or groups terminally bound to a bridge Z, which may react with the reactive atoms or groups of the azo dyestuffs. In Formula Ia D,A,$R_0$ and R have the above-mentioned meanings but in the residue A or $R_0$ and/or R one hydrogen atom is replaced by a reactive atom or a reactive group. For instance, two azo dyestuffs of the formula

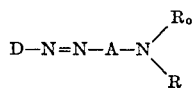 (IIa)

or

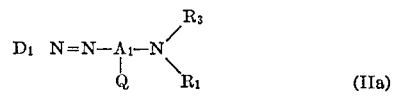 (III$_a$)

where Q represents a reactive atom or a reactive group, for example a carboxyl or sulphonic acid group or their acid halides, or an acylatable group, especially an amino, mercapto or hydroxyl group or their reactive derivatives, and where $R_1$, $R_2$, $R_3$, $R_4$, $A_1$, $A_2$, $D_1$ and $D_2$ have the above meanings, but where $R_4$ may also represent a direct linkage, may be reacted together or with a bifunctional compound of the formula (VIa)        Q—Z—Q where Z has the above mentioned meaning and both the Q''s represent reactive atoms or reactive groups as defined for Q which may react with Q; or (b) a compound, consisting of two coupling components of the formula

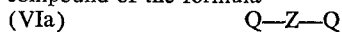 (Ib)

which are linked through a bridge member Z, may be coupled on both sides with diazo compounds of amines of the formula D—$NH_2$; for example, a compound, containing two residues of coupling components of the formulae (IIb)    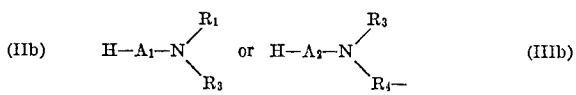    (IIIb)

linked together through a bridge member Z, where $A_1$, $A_2$, $R_1$, $R_2$, $R_3$, $R_4$ and Z have the above meanings, may be coupled with diazo compounds of amines of the formulae $D_1$—$NH_2$ and $D_2$—$NH_2$; or (c) substituents may be subsequently introduced into the disazo or polyazo dyestuffs produced by coupling or condensation, for instance a reactive group by acylation.

Azo dyestuffs having the same components A, $A_1$, $A_2$, D, $D_1$, $D_2$, $R_1$, $R_2$, $R_3$ and $R_4$ may be used for the various processes so that symmetrical disazo or polyazo dyestuffs are obtained; likewise, starting materials may be used in which one or more of these components are different so that asymmetrical disazo or polyazo dyestuffs are obtained. The two residues Q or Q' may of course also be different from each other.

Suitable azo dyestuffs for the process (a) are those which may be obtained by coupling diazo compounds of amines containing sulpho groups, preferably those of the aromatic or heterocyclic series, with any desired coupling components which must contain a reactive atom bound to the nucleus or to an N-alkyl residue, or a reactive group of the type mentioned above.

The following amines containing sulpho groups but no fibre-reactive residue may be mentioned: amines of the benzene series, for example o-, m- or p-aminobenzenesulphonic acid, 1-aminobenzene-2,4- or 2,5-disulphonic acid, 4-aminodiphenyl sulphonic acid; amines of the naphthalene series, for example 1-aminonaphthalene-4-, -5-, -6-, -7- or -8-sulphonic acid, 2-aminonaphthalene-6-sulphonic acid, 1-aminonaphthalene-2,4-, -3,6-, -3,8- or -4,8-disulphonic acid, 2-aminonaphthalene-4,8-, -5,7- or -6,8-disulphonic acid, 1-amino-4-benzoylaminonaphthalene-3,6-, or -4,6-disulphonic acid, 2-aminonaphthalene-1,5,7-trisulphonic acid, 1-aminonaphthalene-2,4,8-, -3,6,8- or -4,6,8-trisulphonic acid; amines of the pyrene series, for example 3-aminopyrene-5-sulphonic acid, 3-aminopyrene-5,8- or -5,1-disulphonic acid, 3-aminopyrene-5,8,10-trisulphonic acid; amines of the heterocyclic series, for example 2-aminobenzthiazole-6-sulphonic acid, dehydrothiotoluidinedisulphonic acid; amines with azo groups, for example 4-aminoazobenzene mono- or disulphonic acid;

The following may be mentioned as amines containing sulpho groups and a fibre-reactive residue:

amines of the benzene series, for example 4- or 5-acylamino-2-aminobenzene-1-sulphonic acid;
amines of the naphthalene series, for example 2-acylamino-6-aminonaphthalene-1,5-disulphonic acid;
amines of the stilbene series, for example 4-acylamino-4'-aminostilbene-2,2'-disulphonic acid;
amines with azo groups, for example 4-acylamino-4'-aminoazobenzene-2-sulphonic acid.

Amines without sulphonic acid groups bound to the nucleus may also be used, provided that the fibre reactive acylamino residue contains a sulphonic acid group. The following may be mentioned as examples:

amines of the benzene series, for example 2-, 3-, or 4-acylaminoaniline, 2- or 4-acylamino-4'-aminodiphenyl, 2- or 4-acylamino-2'-aminodiphenyl and the corresponding diphenyl oxides, sulphones or methanes;
amines of the naphthalene series, for example 1-acylamino-5-aminonaphthalene.

The amines mentioned here are by no means the only compounds suitable as the diazo components. Inter alia, amines having carboxyl groups as the groups imparting solubility in water, for example anthranilic acid and amines containing other substituents, for example hydroxyl groups, for example aminophenols, aminonaphtholsulphonic acid and others may also be used. Metal complexes, for example Cu, Ni or Co complexes may be used, provided complex forming substituents are present in the o-position to the azo groups.

The fibre-reactive acylamino residue may be introduced according to the usual methods by selective acylation of one of the amino groups of the diazo component or of the finished azo dyestuff. The following may be mentioned as acylating agents containing a fibre-reactive residue:

β-chloroacetyl chloride or bromide,
β-chloro- or β-bromopropionyl chloride or bromide,
α,β-dichloro- or dibromopropionyl chloride or bromide,
acryl chloride, α-chloro- or α-bromoacryl chloride or bromide,
trichloroacryl chloride,
chlorocrotonyl chloride,
propiolic acid chloride, 3-nitro-4-chlorobenzene-sulphonic acid or carboxylic acid chloride,
2,2,3,3-tetrafluorocyclobutane-1-carboxylic acid chloride and especially heterocyclic acid halides and their derivatives, for example the 2-chlorobenzoxazole carboxylic acid chlorides, 2-chlorobenzthiazole carboxylic or sulphonic acid chlorides, and especially the following compounds containing at least 2 nitrogen atoms as the hetero atoms of a 6-membered heterocycle:

4,5-dichloro-1-phenylpyridazone carboxylic or sulphonic acid chloride,
4,5-dichloropyridazone propionic acid chloride,
1,4-dichlorophthalazine carboxylic or sulphonic acid chloride,
2,3-dichloroquinoxaline carboxylic or sulphonic acid chloride,
2,4-dichloroquinoxaline carboxylic or sulphonic acid chloride,
2-methanesulphonyl-4-chloro-6-methyl-pyrimidine,
tetrachloropyridazine,
2,4-bis-methanesulphonyl-6-methylpyrimidine,
2,4,6-tri- or 2,4,5,6-tetrachloropyrimidine,
2,4,6-tri- or 2,4,5,6-tetrabromopyrimidine,
2-methanesulphonyl-4,5-dichloro-6-methylpyrimidine,
2,4-dichloropyrimidine-5-sulphonic acid,
5-nitro- or 5-cyano-2,4,6-trichloropyrimidine,
2,6-bis-methanesulphonylpyridine-4-carboxylic acid chloride,
5-nitro-6-methyl-2,4-dichloropyrimidine,
2,6-dichloropyrimidine-4-carboxylic acid chloride,
2,6-dichloropyrimidine-5-carboxylic acid chloride,
2,4-dichloropyrimidine-4-sulphonic acid chloride,
2,4-dichloropyrimidine-5-sulphonic acid chloride,
2,4,6-trichloro-1,3,5-triazine, as well as 2,4,6-tri-(benzenesulphonyl)-1,3,5-triazine and 4,6-dichloro-1,3,5-triazines substituted in the 2-position by an aryl or alkyl residue, for example a phenyl, methyl or ethyl residue, or by a residue of an aliphatic or aromatic mercapto compound bound through the sulphur atom or hydroxyl compound bound through the oxygen atom, or especially by an $NH_2$-group or by the residue of an aliphatic, heterocyclic or aromatic amino compound bound through the nitrogen atom. Compounds in which the residues may be bound to the triazine nucleus in the 2-position by a reaction with trihalogen triazines are, for instance, the following: aliphatic or aromatic mercapto or hydroxyl compounds, for example thioalcohols, thioglycollic acid, thiourea, thiophenols, methanol, ethanol and isopropanol, glycollic acid, phenol, chloro- or nitrophenols, phenol carboxylic and sulphonic acids, naphthols, naphtholsulphonic acid and so on, but especially ammonia and compounds containing acylatable amino groups, for example hydroxylamine, hydrazine, phenylhydrazine, phenylhydrazine sulphonic acids, carbamic acid and its derivatives, semi- and thiosemicarbazides and -carbazones; methyl-, ethyl-, isopropyl-, methoxyethyl-, methoxypropylamine; dimethyl-, diethyl-, methylphenyl-, ethylenephenylamine, chloroethylamine, ethanolamines, propanolamines, benzylamine, cyclohexylamine, morpholine, piperidine, piperazine, aminocarbonic acid esters, glycine ethyl ester, aminoethanesulphonic acid, N-methylaminoethanesulphonic acid, especially aromatic amines, for example aniline, N-methylaniline, toluidines, xylidines, chloroanilines, p- or m-aminoacetanilide, nitroanilines, aminophenols, nitrotoluidines, phenylenediamines, toluylenediamines, anisidine, phenetidine, diphenylamine, naphthylamines, aminonaphthols, diaminonaphthalenes and especially anilines containing acidic groups, for example sulphobenzylamine, sulphanilic, metanilic or orthanilic acid, aniline disulphonic acids, aminobenzyl sulphonic acids, aniline-ω-methanesulphonic acid, aminodibenzoic acids, naphthylamino mono-, di- and trisulphonic acids, aminobenzoic acids, for example 2-hydroxy-5-aminobenzoic acid, aminonaphtholmono-, -di- and -trisulphonic acid and so on, coloured compounds or compounds having dyestuff characteristics, for example 4-nitro-4'-amino-stilbene disulphonic acid, 2-nitro-4'-aminodiphenylamino-4,3'-stilbene disulphonic acid, 2-nitro-4'-aminodiphenylamine-4,3'-disulphonic acid and especially aminoazo dyestuffs or aminoanthraquinones or phthalocyanines that contain at least one reactive amino group.

The introduction of the substituent into the 2-position of the triazine residue may be carried out after the condensation with the starting diamine or after the production of the dyestuff.

Other examples of fibre-reactive residues, apart from those introduced by acylation, are the following: the vinylsulpho, the β-sulphato- or thiosulphatoethylsulphone, the β-thiosulphatopropionylamido-, the β-thiosulphatoethylsulphonylamido- or the sulphonic acid-N, β-sulphatoethylamido groups, which may be introduced in some other way, preferably into the diazo component, for example by ester or thioester formation.

The amines or aminosulphonic acids used in the process of the present invention or acyl derivatives thereof may be diazotized and coupled in the usual manner.

The coupling may take place in the presence of agents that strongly favour coupling in the 4-position to the amino group or hinder coupling in a position adjacent to the amino group.

The coupling components of the benzene or naphthalene series to be coupled with the diazo compounds of the above mentioned amines must contain a reactive atom or a reactive group and must be capable of coupling in the para-position to an amino group. This atom or group may be linked either directly or through an alkylene bridge to the benzene or naphthalene nucleus; or the reactive atom or reactive group may be bound to the coupling component through an N-alkylene bridge of the amino group.

Coupling components may have the following formulae, for example

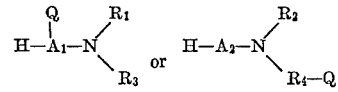

especially

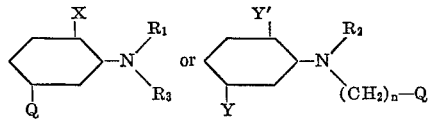

in which $A_1$, $A_2$, $R_1$, $R_3$, Q, $n$, X, Y and Y' have the meanings given for formulae (IIa), (IIIa), (IV), (V) and (VI). X and Y' preferably each represents a hydrogen atom, a methyl, ethyl, methoxy, ethoxy, phenthio or phenoxy group and Y represents one of the above mentioned substituents or a chlorine or bromine atom, a trifluoromethyl or an acylamino group, in which the acyl residue may be the residue of an organic monocarboxylic acid, an organic monosulphonic acid, for example methane,- ethane- or p-toluene monosulphonic acid, or the residue of a carbamic acid or of a carbonic acid monoester or monoamide, for example phenoxycarbonyl, methoxycarbonyl or aminocarbonyl.

The groups $R_1$, $R_2$ and $R_3$ may each represent a hydrogen atom, an alkyl or substituted alkyl group, such as lower alkyl or lower alkyl substituted by cyano, hydroxyl, acetyloxy, carbomethoxy, carboethoxy, or carbopropoxy, for example a halogenated alkyl group, for example β-chloroethyl, β,β,β-trifluoroethyl, β,γ-dichloropropyl, β-cyanoethyl; alkoxyalkyl, for example β-ethoxyethyl or δ-methoxybutyl; hydroxyalkyl, for example β-hydroxyethyl, β,γ-dihydroxypropyl; nitroalkyl, for example β-nitroethyl; carbalkoxy, for example β-carbo(methoxy, ethoxy or propoxy)ethyl, β- or γ-carbo(methoxy or ethoxy)propyl; acylaminoalkyl, for example β-(acetyl or formyl)aminoethyl; acyloxyalkyl, for example β-acetyloxyethyl, β,γ- diacetoxypropyl; β-(alkyl or aryl)-sulphonylalkyl, for example β-methanesulphonylethyl, β-ethanesulphonylethyl or β-(p-chlorobenzenesulphonyl)ethyl; alkyl- or arylcarbamoyloxyalkyl, for example β-methylcarbamyloxyethyl and β-phenylcarbamyloxyethyl; alkoxycarbonyloxyalkyl, for example β-(methoxy, ethoxy or isopropoxy) carbonyloxyethyl, γ-acetamidopropyl, β-(p-nitrophenoxy) ethyl, β-(p-hydroxyphenoxy)ethyl, β,β(β'-acetylethoxycarbonyl)-ethyl, β-[β'-(cyano, hydroxy, methoxy or acetoxy)ethoxycarbonyl]-ethyl, cyanoalkoxyalkyl, β-carboxyethyl, β-acetylethyl, γ-aminopropyl, β-diethylaminoethyl, β-cyanoacetoxyethyl and β-benzoyloxyethyl groups. These groups generally contain no more than eight carbon atoms and preferably no more than six, and especially 1–4 carbon atoms.

Tetrahydroquinoline or benzomorpholine or their derivatives for example, are used as the coupling component when the group R₁, R₂ or R₃ is bound to a ring with the aromatic nucleus.

The following may be mentioned as examples of such coupling components in which Q in the formulae given represents a reactive atom or a reactive group of the given type, for example, a halogen atom, a sulphato group or an aryl or alkylsulphonyloxy group:

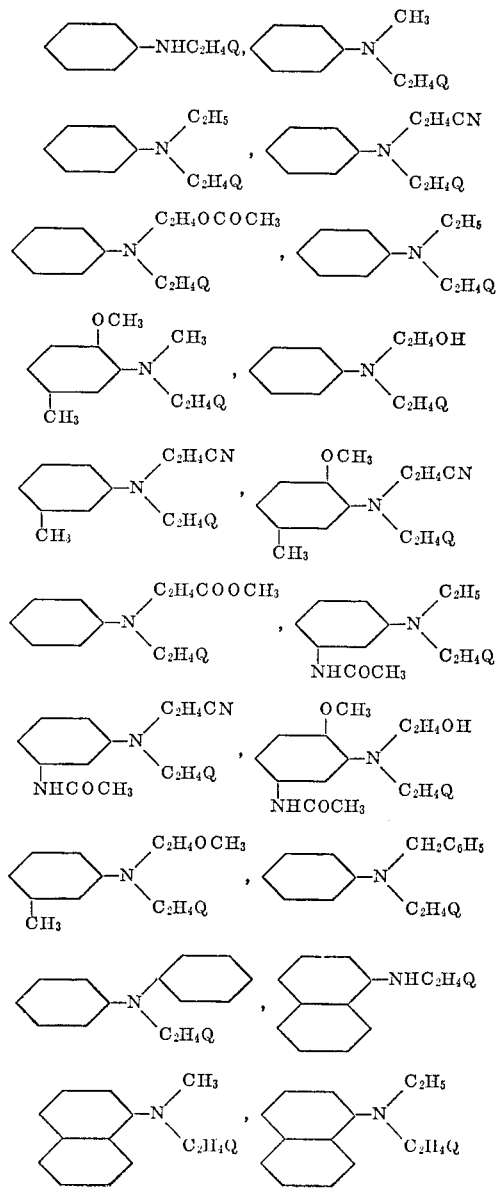

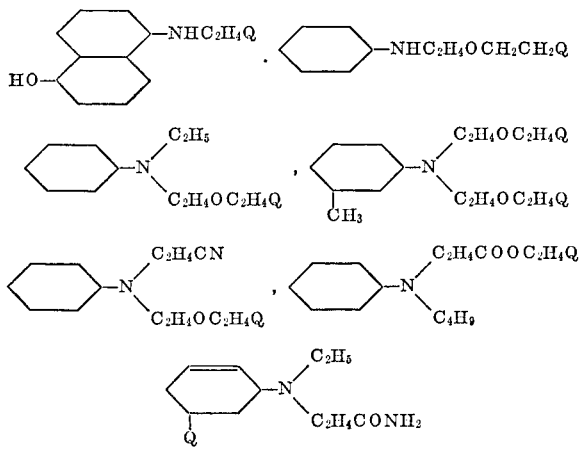

The azo dyestuffs obtained from the above-mentioned diazo and coupling components by coupling and if desired subsequent acylation and which contain in the residue of the coupling component a reactive atom or a reactive group, may be linked by condensation with bifunctional compounds or directly with each other according to production method (a), simultaneously or in any desirable sequence. Ester or amide bridges may be formed during this process, for instance by the reaction of acids, especially carboxylic acids or their derivatives, for example anhydrides, esters, halides or of isocyanates with hydroxy or amino compounds. Oxygen or nitrogen bridges may also be formed, for instance by the reaction of hydroxy or amino compounds with compounds containing readily splittable multi-valent bonds or readily removable groups (for instance sulphato groups) or atoms (for example halogen atoms), or of compounds with readily openable heterocyclic rings (for example epoxy compounds) with compounds containing readily removable hydrogen atoms. These reactive atoms or groups correspond to the above-mentioned residues defined as Q or Q'; they may be present in the coupling components or the compounds used for linking. For example, the hydroxyl, amino or epoxide groups may occur in the compound Q'—Z—Q' (as Q') and the acids or acid derivative groups or hydrogen atoms in the coupling components of the azo dyestuffs reacting with those groups may occur in these dyestuffs, (as Q or vice versa); or the compound Q'—Z—Q' may, for example, contain a hydroxyl, amino or epoxide group on one side and a reactive hydrogen atom or an acid or an acid derivative group on the other. The reaction of the azo dyestuffs with the compounds used as the bridge member is carried out by the usual methods.

The bridge members formed during the reaction have preferably the general composition given in formula VI and correspond, for example, to the following formulae:

—CCH₂—CH₂—, —CH₂—CH=CH—CH₂—

—CH₂—CH₂—NH—CH₂—CH₂—, —CH₂—CH₂—O—CH₂—CH₂—

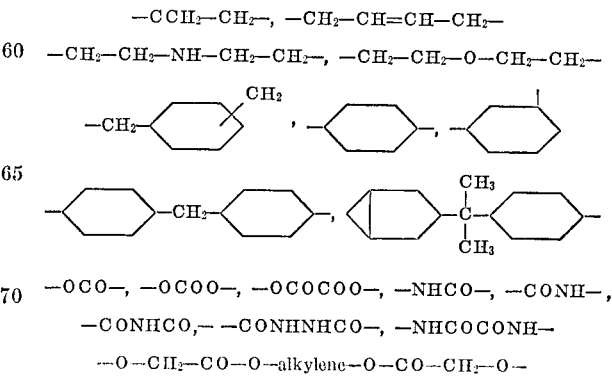

—OCO—, —OCOO—, —OCOCOO—, —NHCO—, —CONH—,

—CONHCO,— —CONHNHCO—, —NHCOCONH—

—O—CH₂—CO—O—alkylene—O—CO—CH₂—O— as well as the colourless linking members of formulae

—X"—CO—R"—COX"

—X"—CO—NH—R"—NH—CO—X" or

—OCOY"—R"—Y"—OCO— or

—X"—SO$_2$—R"—SO$_2$—X"—,

—X"—SO$_2$—NH—R"—NH—SO$_2$—X" or

—OSO$_2$Y"—R"—Y"—OSO$_2$—, where X" and Y" each represents —O—, —S—, —NR"— or —NH—; and R" represents a low-molecular substituted or unsubstituted alkylene bridge or a substituted or unsubstituted phenylene or diphenylene bridge, for example, an ethylene, hexamethylene, phenylene, toluylene or diphenylene bridge.

The following acids (or their halides, anhydrides, or esters) are examples of suitable bifunctional reactants: Oxalic, succinic, malonic, pimelic, adipic, methyladipic, azelaic, sebacic, maleic, fumaric, allylsuccinic, dodecylsuccinic, diglycollic, methylene-bis-thioglycollic, 2,3-dibromosuccinic, thiodibutyric, tetrahydrophthalic, hexahydrophthalic, endomethylenetetrahydrophthalic, methylene-endomethylenetetrahydrophthalic, hexachloroendomethylenetetrahydrophthalic, phthalic, isophthalic, terephthalic, naphthalene-1,8- or -2,6-dicarboxylic acid, 2,5-thiophenedicarboxylic acid, furandicarboxylic acid, pyridinedicarboxylic acid, the dicarboxylic acids of the formulae

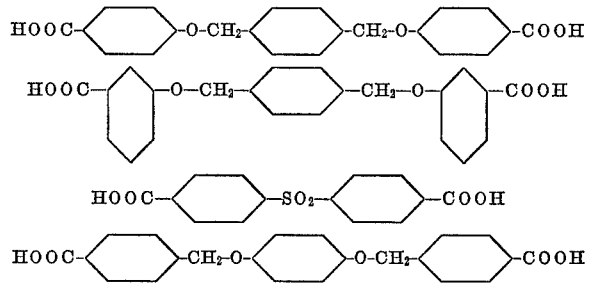

also the halides of aliphatic and specially aromatic disulphonic acids, and specially aliphatic, cycloaliphatic, araliphatic, aromatic or heterocyclic diisocyanates (which may be prepared in situ), for example, hexamethylene-diisocyanate, N,N'-bis-(4-methyl-3-isocyanatophenyl)-urea, cyclohexane-1,4-diisocyanate, 1,2,3,4,5,6-hexahydrodiphenylmethane-4,4'-diisocyanate; as well as aromatic diisocyanates, for example, toluene-2,4- or -2,6-diisocyanate or mixtures thereof, phenylene-1,4-diisocyanate, bis-(4-methyl-3-isocyanatophenyl)-carbodiimide, diphenyl-4,4'-diisocyanate, diphenylmethane-4,4'-diisocyanate, diphenylmethane-3,3'-diisocyanate, diphenyl-dimethylmethane-4,4'-diisocyanate, stilbene-4,4'-diisocyanate, benzophenone-4,4'-diisocyanate, di-(4-isocyanatophenyl)-carbonate; diphenyl ether or diphenylsulphide diisocyanate, as well as their substitution products, for example, the derivatives substituted with alkyl, alkoxy, halogen or nitro groups, for example, 3,3'-dimethyl- or 3,3'-dimethoxy- or 3,3'-dichloro-diphenylmethane-4,4'-diisocyanate; diisocyanates of the naphthalene series, for example, naphthylene-1,5-diisocyanate, heterocyclic diisocyanates, for example, diisocyanates of benzofuran or those containing urea or uretdione groups, for example, 1,3-bis(4'-methyl-3'-isocyanatophenyl)-uretdione.

The production of carbonic acid diesters or diamide (=urea) bridges or of carbamic acid ester bridges may be carried out directly with phosgene or in steps, that is by first producing the chloroformic acid ester of one azo dyestuff. Bis-carbonic acid diester or diamide (=bis-urea) bridges or bis-carbamic acid ester bridges or combinations of such bridges may be obtained by reacting 2 mols of the chloroformic acid ester of an azo dyestuff with one mol of a diol, a diamine or a dithiol to obtain diurethane, bis-(thiourethane) or a bis-urea compound.

The following compounds may be mentioned as such divalent, aliphatic, cycloaliphatic, araliphatic or aromatic hydroxy, mercapto or amino compounds: 1,2-dihydroxyethane, 1,2- or 1,3-dihydroxypropane, 1,2- or 1,3- or 1,4- or 2,3-dihydroxybutane, 1,2- or 1,3- or 1,4- or 1,5- or 2,3- or 2,4-dihydroxypentane; the corresponding dihydroxyhexanes, -heptanes, -octanes, -nonanes, -decanes, -undecanes, -dodecanes, -hexadecanes, -octadecanes; 1,4-dihydroxybutene, 1,4-dihydroxy-2-methylbutane, 1,5-dihydroxy-2,2-dimethylpentane, 1,5-dihydroxy-2,2,4-trimethylpentane, di-($\beta$-hydroxyethyl)-thioether, di-($\beta$-hydroxyethyl)-ether (=diglycol), triglycol, cyclohexanediol-1,2- or -1,3 or -1,4; 4,4'-dihydroxy-dicyclohexylmethane, 4,4'-dihydroxy-dicyclohexylmethylmethane, 4,4'-dihydroxy-dicyclohexyldimethylmethane, 4-hydroxybenzyl alcohol, 1,4-di-($\beta$-hydroxyethoxy)-benzene, 1,2-, 1,3- or 1,4-dihydroxybenzene, 1-methyl-2,4- (or -2,3- or -3,4- or -2,6- or -2,5- or -3,5)-dihydroxybenzene, 1,3-dimethyl-2,4- (or -4,6)-dihydroxybenzene, 1,4-dimethyl-2,5-dihydroxybenzene, 1-ethyl-2,4-dihydroxybenzene, 1-isopropyl-2,4-dihydroxybenzene, 2,4- or 4,4'-dihydroxydiphenyl ether, 2,2'-dihydroxyethyleneglycol diphenyl ether, 1,3- or 1,4- or 1,5- or 1,6- or 1,7- or 1,8- or 2,6- or 2,7-dihydroxynaphthalene, 4,4'-dihydroxydiphenylamine, 2,4'- or 4,4'-dihydroxydiphenyl, 4,4'-dihydroxydiphenylmethane, 4,4'-dihydroxydiphenylmethylmethane, 4,4'-dihydroxydiphenyldimethylmethane, 1,1'-di-(4'-hydroxyphenyl)-cyclohexane, 4,4'-dihydroxy-diphenyl-(di)-sulphide, 4,4'-dihydroxy-diphenylsulphone or the corresponding aliphatic and aromatic dithiols.

1,2-diaminoethane,
1,2- or 1,3-diaminopropane,
1,2- or 1,3 or 1,4- or 2,3-diaminobutane,
1,2- or 1,3- or 1,4- or 1,5- or 2,3- or 2,4-diaminopentane;
the corresponding diaminohexanes,
-heptanes,
-octanes,
-nonanes,
-decanes,
-undecanes,
-dodecanes,
-hexadecanes,
-octadecanes;
1,4-diaminobutene,
1,4-diamino-2-methylbutane,
1,5-diamino-2,2-dimethylpentane,
1,5-diamino-2,2,4-trimethylpentane,
di-($\beta$-aminoethyl)-thioether,
di-($\gamma$-aminopropyl)-ether,
di-($\gamma$-aminopropyl)-ether-$\omega,\omega$-diamine,
di-($\omega$-aminohexyl)-thioether,
N,N-dimethyldiaminoethane-1,2;
N,N'-diethyldiaminoethane-1,2,
1-amino-3-methylaminopropane,
isophoronediamine,
piperazine,
N-2-aminoethyl-piperazine,
4-aminopiperidine,
$\omega,\omega$-diamino-1,3-(or -1,4)-dimethylbenzene,
$\omega,\omega$-diamino-1,4-(or -1,2)-dimethylcyclohexane,
$\omega,\omega$-diamino-1,4-diethylbenzene,
$\omega,\omega$-diamino-1,4-(or -1,5)-dimethylnaphthalene,
$\omega,\omega$-diamino-di-n-propyldiphenyl,
1,2- or 1,3- or 1,4-diaminocyclohexane,
1-methyl-2,4-diaminocyclohexane,
1-ethyl-2,4-diaminocyclohexane,
4,4'-diaminodicyclohexylmethane,
4,4'-diaminodicyclohexylmethylmethane,
4,4'-diaminodicyclohexyldimethylmethane,
4,4'-diamino-2,2'-dimethyldicyclohexylmethane,
4,4'-diamino-3,3'-dimethyldicyclohexylmethane,
4-aminobenzylamine,
2-(4'-aminophenyl)-1-aminoethane,
1-(3'-aminophenyl)-1-aminoethane,
3-(3'- or 4'-aminophenyl)-1-aminopropane,
3-(3'- or 4'-aminophenyl)-1-aminobutane,
tetrahydronaphthylenediamine-1,5- or 1,4;

hexahydrobenzidine-4,4'-diamine,
hexahydrodiphenylmethane-4,4'-diamine,
1,2-, 1,3- or 1,4-diaminobenzene,
1-methyl-2,4-(or -2,3 or -3,4- or -2,6- or -2,5- or 3,5)-diaminobenzene,
1,3-dimethyl-2,4-(or -4,6-)-diaminobenzene,
1,4-dimethyl-2,5-diaminobenzene,
1-ethyl-2,4-diaminobenzene,
1-isopropyl-2,4-diaminobenzene,
diamino-diethylbenzene,
diisopropyl-diaminobenzene,
1-chloro-2,4-diaminobenzene,
1,3-dichloro-2,4-(or -4,6)-diaminobenzene,
1,4-dichloro-2,5-diaminobenzene,
2,4-(or -4,4')-diaminodiphenyl ether,
ethyleneglycoldiphenyl ether2,2'-diamine,
diethyleneglycol diphenyl ether-2,2'-diamine,
N,N'-dimethylphenylenediamine-1,3- or -1,4-,
N-methylphenylenediamine-1,4-;
1,3-, 1,4-, 1,5-, 1,6-, 1,7-, 1,8-, 2,6- or 2,7-naphthylenediamine,
1,1'-dinaphthyl-2,2'-diamine,
4,4'-diaminodiphenylamine,
2,4'- or 4,4'-diaminodiphenyl,
3,3'-dimethyl-4,4'-diaminodiphenyl,
2,2'- or 3,3'-dichloro-4,4'-diaminodiphenyl,
4,4'-diaminodiphenylmethane,
4,4'-diaminodiphenylmethylmethane,
4,4'-diaminodiphenyldimethylmethane,
2,2'-dimethyl-4,4'-diaminodiphenylmethane,
2,5,2',5'-tetramethyl-4,4'-diaminodiphenylmethane,
1,1-di-(4'-aminophenyl)-cyclohexane,
1,1-di-(4'-amino-3'-methylphenyl)-cyclohexane,
3,3'-diaminobenzophenone,
2,4-diaminodiphenylethane-1,2;
4,4',4''-triaminotriphenylmethane,
4,4'-diamino-2,2',5,5'-tetramethyltriphenylmethane,
4,4'-diamino-2,2',5,5'-tetramethyl-2''-chlorotriphenylmethane,
fluoroenediamine-2,7;
2,6-diaminoanthraquinone,
9-ethylcarbazole-3,6-diamine,
pyrene-3,8-diamine,
chrysene-2,8-diamine,
benzidinesulphone-4,4'-diamine,
diphenylsulphide-2,4-diamine,
diphenyldisulphide-4,4'-diamine,
diphenylsulphone-4,4'-diamine,
diphenylmethanesulphone-4,4'-diamine,
4-methyl-3-amino-benzenesulphonic acid-(4'-aminophenyl)-ester,
di-(4-aminobenzenesulphonyl)-ethylenediamine-3,3'-dimethoxy-4,4'-diaminodibenzyl thioether,
4,4'-dimethoxy-3,3'-diaminobenzothioethylene glycol and
3,3'-dimethoxy-4,4'-diaminodibenzylsulphone.

Besides the dialcohols, dithiols and diamines other bifunctional compounds containing any two of the functions mentioned above may of course be used.

The introduction of ether bridges is carried out, for example, by the reaction of alkali metal phenolates with dichlorides, for example, 1,4-dichlorobutene, di-β-chloroethylether, dichloroethyl formal and isomers of bis-(chloromethyl)-benzene or by addition reaction with bifunctional compounds containing double bonds capable of accepting addition (for example, divinylsulphone) or rings capable of addition, for example, dihydropyranyl rings (cf. for example British Pat. 996,705) or especially epoxide rings. The following may be mentioned as examples of such epoxides:

Alicyclic polyepoxides containing at least one epoxide group in the alicyclic ring, for example, vinylcyclohexene dioxide, limonene dioxide, dicyclopentadiene dioxide, bis-(2,3 - epoxycyclopentyl) ether, ethyleneglycol-bis-(3,4-epoxy-tetrahydrodicyclopentadien - 8 - yl)-ether, (3,4-epoxytetrahydrodicyclopentadien - 8 - yl)glycidyl ether; compounds containing two epoxycyclohexyl residues bound through ester or acetal bonds, for example, diethylene-glycol-bis-(3,4 - epoxycyclohexanecarboxylate), bis-3,4 - (epoxycyclohexylmethyl)-succinate, 3,4 - epoxy-6-methylcyclohexylmethyl - 3,4 - epoxy - 6 - methylcyclohexanecarboxylate as well as the acetal of 3,4-epoxyhexahydrobenzaldehyde and 3,4-epoxycyclohexane-1,1-dimethanol; but especially bifunctional compounds containing two terminal epoxide groups, for example, butadiene-diepoxide, diglycidyl ethers of dihydric alcohols, for example, glycol-diglycidyl ether; diglycidyl ethers of dihydric phenols, for example, 4,4'-dihydroxydiphenylmethane, -dimethylmethane or -sulphone; the N,N'-diglycidyl compounds, for example those of N,N'-dimethyl-4,4'-diaminodiphenylmethane; ethylene urea or oxamide, and diglycidyl esters of aliphatic, cyclo-aliphatic or aromatic dicarboxylic acids, for example phthalic acid, hexahydrophthalic acid, tetrahydrophthalic acid or succinic acid.

The dyestuffs of the present invention may also be obtained according to the production method (b) by coupling two coupling components (bound to each other through a bridge linkage) with diazotized amines. Examples of suitable coupling components are the following of the formulae (IVb)

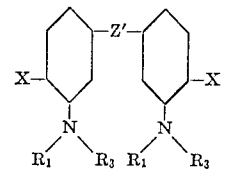

or (Vb)

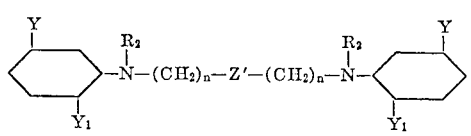

in which X, Y, $Y_1$, Z', $R_1$, $R_2$, $R_3$ and $n$ have the same meanings as given for Formulae (IV and V).

Such bifunctional coupling components may be manufactured in principle in the same manner as described for method (a) for the linking of azo dyestuffs. Method (b) is specially suitable for the production of dyestuffs containing a bridge linkage bound to the nucleus of the coupling component, since a large number of readily available starting materials exist, which may be easily linked due to the presence of reactive, nucleus-bound atoms, for example, hydrogen atoms or groups, for example, the isocyanate, carboxyl or hydroxyl groups, or of nucleus-bound groups capable of conversion into reactive groups (for example by the reduction of nitro groups to amino groups or by chlorination of carboxyl groups to carboxychloride groups), and in which the amino group para to the coupling position need not be present at the start but may be produced subsequently, for instance by reducing a nitro group (which may be followed by a conversion into a secondary or tertiary amino group). The following may be mentioned as examples of bifunctional coupling components:

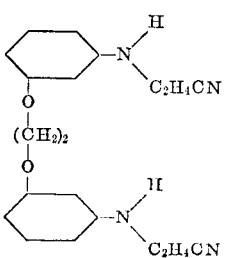 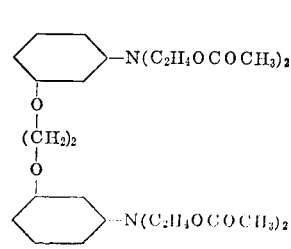

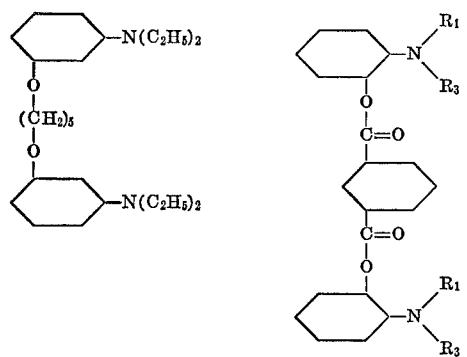
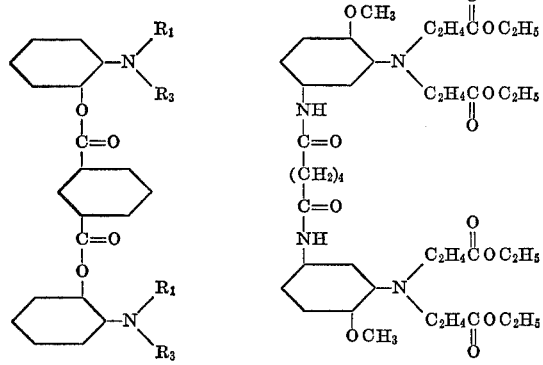
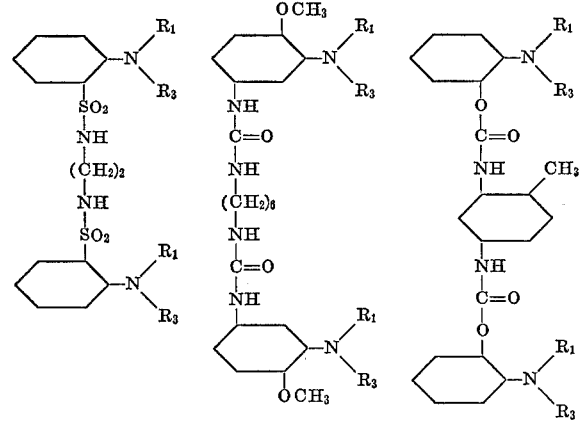
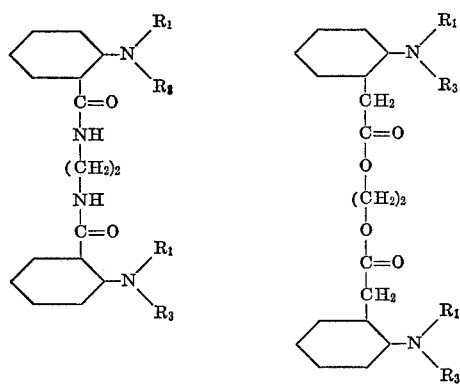
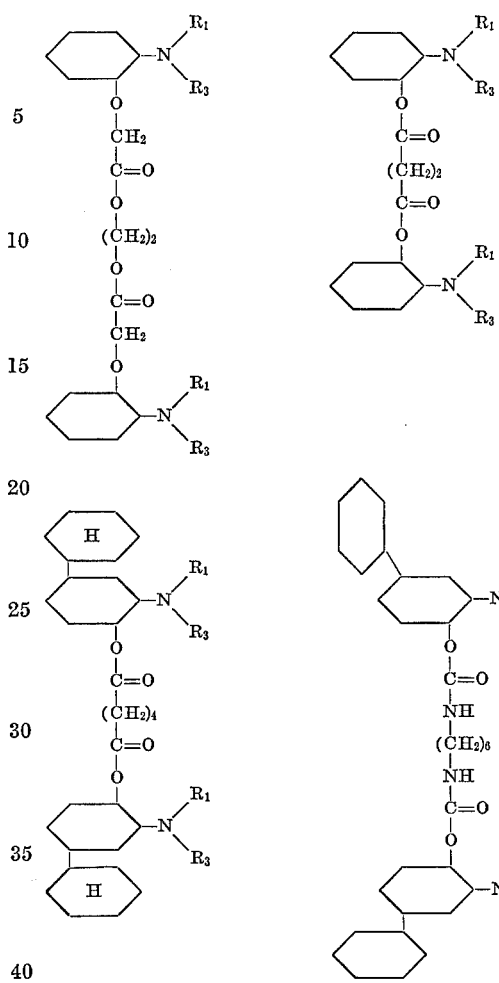

where $R_1$, $R_2$, $R_3$ and $R_4$ have the above meanings.

When at least one of the two azo residues is directly bound to the bridge linkage the diamines used as bifunctional coupling components are new compounds, i.e. they correspond for example to Formula IVb and form part of the invention. They are manufactured as mentioned above by linking, often advantageously using as starting materials aromatic nitro compounds and reducing the bis-nitro compounds obtained after the linkage by known methods (for instance catalytically or in the presence of acids) and if desired followed by alkylation, for instance, by reaction with alkyl halides, for example, ethyl chloride, monoepoxides, for example, ethylene oxide, halogenhydrine, for example, ethylene chlorohydrin or ethyleneimine, and, if desired, carrying out further reactions with the alkyl groups present at the nitrogen atom, for instance, acylating β-hydroxy or β-aminoethyl groups with acid chlorides, anhydrides or isocyanates.

Other methods of production are available apart from the two above-mentioned most usual methods by condensation or addition of the two azo dyestuffs to the compound used as the bridge linkage, or by coupling the two diazo components to a compound linked to both coupling components through a bridge linkage. For instance, in method (c) a fibre reactive resdue may be introduced into disazo or polyazo dyestuffs that already contain two azo dyestuff residues bound through a bridge member, and of which at least one contains an acylatable group (especially an amino group) in the diazo component, by subsequent condensation with acylating agents containing a fibre-reactive residue. Suitable acylating agents are those mentioned above. Subsequently, if desired, (for instance after acylation with a trihalogen triazine) a halogen atom in the triazine ring may be replaced, for example, by an amino group.

The dyestuffs obtained by the present process and its variants are new substances. They are suitable for dyeing and printing the most varied materials, for example of animal origin, for example, leather, silk, wool and especially polyamide fibers as well as polyurethanes or mixtures containing such fibres; the fibre-reactive dyestuffs are also suitable for dyeing cellulosic fibres, for example, cotton. Wool and polyamide fibres may be dyed in a neutral or especially a weakly acidic bath, for example, an acetic acid bath. It is recommended in certain cases to add polyglycol ether derivatives to the dyebath so as to obtain uniform dyeing, especially when using dyestuffs with reactive groups, and is especially recommended for wool. These polyglycol ether derivatives should contain on the average at least ten

—CH$_2$—CH$_2$—O— groups and be derived from monoamines containing an aliphatic hydrocarbon residue of at least 20 carbon atoms. The new dyestuffs take very well to polyamide fibres, and the resultant colorations and prints exhibit excellent light and wet fastness, especially good fastness to washing, fulling and water and frequently require no further treatment. Wool dyed with fibre-reactive dyestuffs also exhibits good fastness to perspiration.

Dyestuffs containing reactive groups are also suitable for dyeing and printing cellulosic materials. In this case, however, the dyestuffs of the present invention require fixation by heat treatment in the presence of alkali, for example, sodium carbonate, sodium hydroxide or trisodium phosphate.

Unless otherwise indicated, parts and percentages in the following examples are by weight and temperatures are given in degrees centigrade.

EXAMPLE 1

5.06 parts of aniline-2,5-disulphonic acid are dissolved in 125 parts of water and to the solution 5 parts of concentrated hydrochloric acid and 5 parts of a 4 N NaNo$_2$ solution are added. The resultant diazo solution is added dropwise at a temperature between 5 to 10° to a solution of 4.06 parts of the carbonic acid diester of N-$\beta$-cyanoethyl-N-$\beta$-hydroxyethylaniline in 100 parts of acetone, 20 parts of concentrated hydrochloric acid and 80 parts of water. The resultant mixture is stirred overnight at a temperature between 0 to 5° C., adjusted to a pH-value between 6.5 to 7 with a 30% solution of sodium hydroxide and evaporated in a rotary evaporator. A salt-containing dyestuff is obtained, which corresponds to the formula

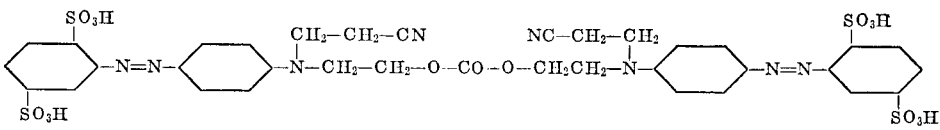

and which dyes nylon yellow tints fast to wetting and light.

EXAMPLE 2

6.96 parts of the amide of thiophene-2,5-dicarboxylic acid and N-bis-$\beta$-acetoxyethyl-3-aminoaniline are used in place of 4.06 parts of the carbonic acid diester of N-$\beta$-cyanoethyl-N-$\beta$-hydroxyethylaniline and the same procedure is used as in Example 1. A dyestuff corresponding to the formula

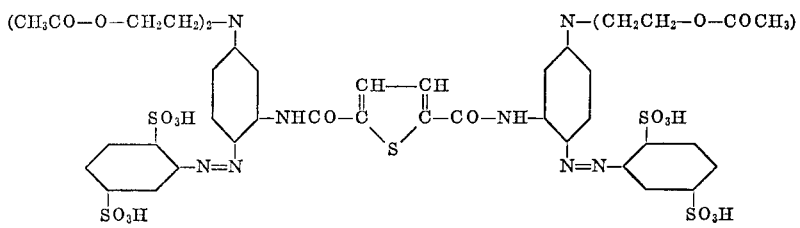

is obtained, which also dyes nylon yellow tints fast to wetting and light.

EXAMPLE 3

6.96 parts of the amide of succinic acid and N-$\beta$-cyanoethyl-3-aminoaniline (whose production is described below) are used in place of 4.06 parts of the carbonic acid diester of N-$\beta$-cyanomethyl-N-$\beta$-hydroxyethylaniline and the procedure of Example 1 carried out. A dyestuff is obtained corresponding to the formula

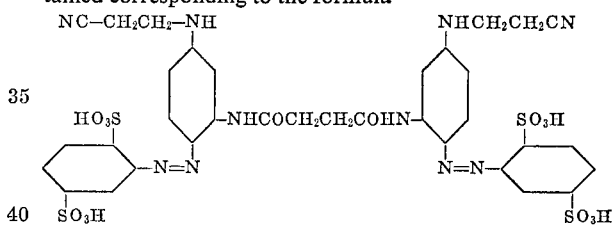

which also dyes Nylon yellow tints fast to wetting and light.

Succinic acid - di - [3-(N,$\beta$-cyanoethyl)-amino]-anilide may be manufactured as follows:

138 parts of 3-nitroaniline are dissolved in 600 parts of pyridine and the solution is cooled to 10° C. 77.5 parts of succinic acid dichloride are added dropwise to the solution at a temperature between 10 to 15° C., stirring is continued for two hours at 10 to 15° C. and then overnight at room temperature. The mixture is then poured over 1000 parts of ice and the precipitated product filtered, washed neutral with water and dried in vacuo at 50° C.

100 parts of the compounds obtained of the formula

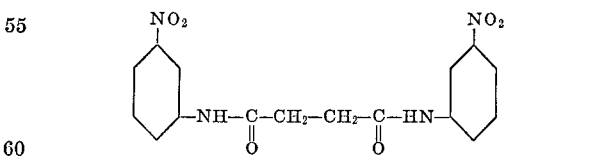

are hydrogenated in 1000 parts of dimethylformamide in the presence of Raney nickel. The catalyst is filtered and half the solvent removed in vacuo. The remaining solution is poured dropwise into ten times its amount of ice water. The precipitated diamine of the formula

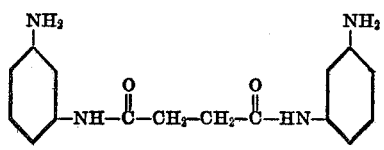

is finally filtered, washed thoroughly with water and dried in vacuo.

61 parts of the product obtained are heated with 150 parts of acrylonitrile and 12 parts of glacial acetic acid in an autoclave for 15 hours at 135 to 140° C. The solution is then concentrated to ⅓ of its volume, the remaining suspension allowed to stand overnight and then filtered. The residue is washed with a little glacial acetic acid, then with ether and dried in vacuo. A product of the formula

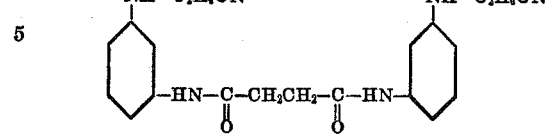

is obtained.

The amines shown in column I of the following table may be diazotized in a like manner and coupled at a molar ratio of 2:1 with the coupling components shown in column II, to obtain dis- or tetrakisazo dyestuffs which dye Nylon the shades shown in column III.

| I | II | III |
|---|----|-----|
| ![structure: benzene with SO₃H, SO₃H, NH₂] | ![structure: H₅C₂-N...bis-coupling component with (CH₂)₂, CH₃, O-CO-(CH₂)₄-CO-O] | Yellow. |
| ![structure: benzene with SO₃H, NH₂] | Same as above | Do. |
| ![structure: CH₂–CHBr / Br CONH / benzene SO₃H NH₂] | ....do.... | Do. |
| ![structure: H₃C, SO₂, HO₃S, NH₂ benzene, CH₂Br–CHBr–CONH] | ....do.... | Scarlet. |
| ![structure: H₃C, SO₂, HO₃S, NH–benzene–NH₂, CH₂Br–CHBr–CO] | ....do.... | Do. |
| ![structure: CH₂–CHBr / Br CONH–benzene–NH₂, SO₃H] | ....do.... | Orange. |
| ![structure: CH₂–CHBr / Br CONH–benzene–NH₂, SO₃H, SO₃H] | ....do.... | Yellow. |
| ![structure: O₂N–benzene(SO₃H)–NH₂] | ....do.... | Claret. |
| ![structure: HO₃S–benzene–N=N–benzene(SO₃H)–NH₂] | ....do.... | Do. |
| ![structure: CH₂Br–CHBr–CONH–benzene(HO₃S)–NH₂] | ....do.... | Orange. |
| ![structure: naphthalene with SO₃H, SO₃H, HO₃S, NH₂] | ....do.... | Do. |

| I | II | III |
|---|---|---|
| [structure: benzene with SO₃H, NH₂, CH₃CONH] | ......do...... | Do. |
| [structure: naphthalene with SO₃H, NH₂, SO₃H] | ......do...... | Do. |
| [structure: naphthalene with SO₃H, NH₂, SO₃H, SO₃H] | ......do...... | Do. |
| [structure: benzene with SO₃H, NH₂, SO₃H] | [structure: bis(ethylamino-methylcyclohexyl) oxalate diester] | Yellow. |
| [structure: benzene with SO₃H, NH₂] | Same as above | Do. |
| [structure: azo compound with SO₃H, NH₂, HO₃S] | [structure: bis(ethylamino-methylphenyl)-(CH₂)₂-O-(CH₂)₂ linker] | Claret. |
| Same as above | [structure: bis(ethylamino-methylphenyl) carbonate with (CH₂)₂ spacers] | Do. |
| [structure: benzene with H₃C, SO₂, HO₃S, NH₂, CH₂Br-CHBr-CO-NH] | [structure: H₅C₂-N-phenyl-(CH₂)₂-O-CO-NH-(CH₂)₆-NH-CO-O-(CH₂)₂-phenyl-N-C₂H₅] | Orange. |
| Same as above | [structure: H₅C₂-N-phenyl-(CH₂)₂-O-CO-phenyl-CO-O-(CH₂)₂-phenyl-N-C₂H₅] | Do. |
| [structure: benzene with SO₃H, NH₂, HO₃S] | [structure: NC-H₄C₂-N-phenyl-(CH₂)₂-O-CO-NH-(CH₃-phenyl)-NH-CO-O-(CH₂)₂-phenyl-N-C₄H₄CN] | Reddish-yellow. |
| [structure: naphthalene with HO₃S, NH₂, OH, HO₃S] | [structure: H₅C₂-N-phenyl-(CH₂)₂-O-CO-(CH₂)₄-CO-O-(CH₂)₂-phenyl-N-C₂H₅] | Claret. |
| [structure: benzene with SO₃H, NH₂, NHCOCH₂Cl] | Same as above | Yellow. |

| I | II | III |
|---|---|---|
| benzene with SO₃H, NH₂, NHCOC(Cl)=CH₂ | ...do... | Do. |
| benzene with SO₃H, NH₂, NHCOCHClCH₂Cl | ...do... | Do. |
| benzene with SO₃H, NH₂, NHCOC(Br)=CH₂ | ...do... | Do. |
| benzene with SO₃H, NH₂, NHCOCHBrCH₂Br | ...do... | Do. |
| triazine: Cl, CH₃O, NH-benzene(SO₃H)₂-NH₂ | ...do... | Do. |
| benzene with SO₃H, NH₂, NHCOCH₂CH₂Cl | ...do... | Do. |
| benzene with SO₃H, NH₂, NHCOCH=CH₂ | ...do... | Do. |
| benzene with SO₃H, NH₂, SO₃H | bis[N(C₂H₅)(CH₃-C₆H₄)-C₂H₄-OCO]-benzene-NO₂ | Do. |
| naphthalene with (SO₃H)₂, NH₂ | Same as above | Do. |
| HO₃S–C₆H₄–N=N–C₆H₃(SO₃H)(NH₂) | ...do... | Claret. |
| BrCH₂CHBrCONH–C₆H₃(SO₃H)(NH₂) | ...do... | Orange. |
| O₂N–C₆H₃(SO₃H)(NH₂) | ...do... | Claret. |

| I | II | III |
|---|---|---|
| HO₃SOCH₂CH₂HNO₂S—⟨C₆H₄⟩—NH₂ | H₅C₂—N(—(CH₂)₂—O—CO—(CH₂)₄—CO—O—(CH₂)₂—)N—C₂H₅ with two methyl-substituted phenylene rings | Yellow. |
| 2-SO₃H, 1-N=N—⟨C₆H₄⟩—NH₂ (benzene) | Same as above | Red. |
| Naphthalene with SO₃H, NH₂, HSO₃ | do | Orange. |
| SO₃H-⟨⟩—N=N—⟨⟩—NH₂ | H₅C₂—N(—(CH₂)₂—O—CO—C—O—(CH₂)₂—)N—C₂H₅ (bis-phenyl) | Yellow. |
| 1-SO₃H, 2-NH₂, 4-SO₃H benzene | C₂H₅—N(—(CH₂)₂—NH—CO—CH=CH—CO—NH—(CH₂)₂—)N—C₂H₅ (bis-phenyl) | Golden yellow. |
| CH₃O—triazine(Cl)—NH—⟨C₆H₃(SO₃H)₂⟩—NH₂ | H₅C₂—N(—(CH₂)₂—O—CO—(CH₂)₄—CO—O—(CH₂)₂—)N—C₂H₅ with two methyl-substituted phenylene rings | Yellow. |
| HO₃SOCH₂CH₂SO₂—⟨C₆H₄⟩—NH₂ | Same as above | Do. |
| HO₃SOCH₂CH₂SO₂—⟨C₆H₄(NH₂)⟩ | do | Do. |
| HO₃SOCH₂CH₂NHSO₂—⟨C₆H₄(NH₂)⟩ | do | Do. |
| 1-SO₃H, 2-NH₂, 4-SO₃H benzene | ⟨⟩—N(C₂H₅)—CH₂—CH(OH)—CH₂—N(CH₂CH(CH₃)₂)—CH₂—CH(OH)—CH₂—N(C₂H₅)—⟨⟩ | Yellowish-orange. |
| Br—CH₂—CH(Br)—CO—HN—⟨C₆H₃(SO₃H)(NH₂)⟩ | ⟨⟩—N(C₂H₅)—CH₂—CH(O—CO—CH₃)—CH₂—O—(CH₂)₄—O—CH₂—CH(CH₃—CO—O)—CH₂—N(C₂H₅)—⟨⟩ | Orange. |
| 1-SO₃H, 2-NH₂, 4-SO₃H benzene | ⟨⟩—N(C₂H₅)—CH₂—CH(OH)—CH₂—O—(CH₂)₄—O—CH₂—CH(OH)—CH₂—N(C₂H₅)—⟨⟩ | Yellowish orange. |
| Same as above | ⟨⟩—N(C₂H₅)—CH₂—CH(OCO—CH₃)—CH₂—N(CH₂CH(CH₃)₂)—CH₂—CH(O—CO—CH₃)—CH₂—N(C₂H₅)—⟨⟩ | Yellow. |
| Do | ⟨⟩—N(C₂H₅)—CH₂—CH₂—SO₂—CH₂—CH₂—N(C₂H₅)—⟨⟩ | Do. |

| I | II | III |
|---|---|---|
| 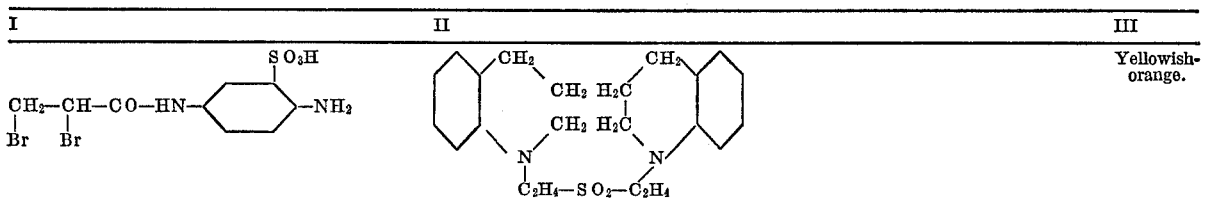 | | Yellowish-orange. |

EXAMPLE 4

34.8 parts of 6-nitro-2-aminonaphthalene - 4,8 - disulphonic acid are dissolved in 100 parts of water and neutralized with sodium carbonate. The solution is mixed with 7 parts of sodium nitrite and run into a mixture of 30 parts of 30% hydrochloric acid and 200 parts of ice water. Any excess of nitrite is decomposed with sulphamic acid and to the resultant diazo compound a solution of 23.4 parts of the adipic acid diester of N-β-hydroxyethyl-N-ethyl-m-toluidine in 200 parts of acetone is run in dropwise. The resultant mixture is stirred overnight, adjusted to a pH value between 6.5 to 7.0 by the addition of a 30% solution of sodium hydroxide and the solution is stirred for a further 24 hours. The precipitated dyestuff is filtered and washed with water and acetone. The precipitated dyestuff is stirred with 1600 parts of water at 50° C. and a solution of 8.5 parts of sodium hydrogen sulphide in 100 parts of water is slowly added dropwise. When all has dissolved, the mixture is stirred for one hour, some blood charcoal and silica gel (Hyflow-Super-Cel) are added and the precipitated sulphur is filtered. The clear dyestuff solution is saturated with sodium chloride and stirred till the dyestuff is completely separated, when it is filtered.

56 parts of the dyestuff thus separated of the formula

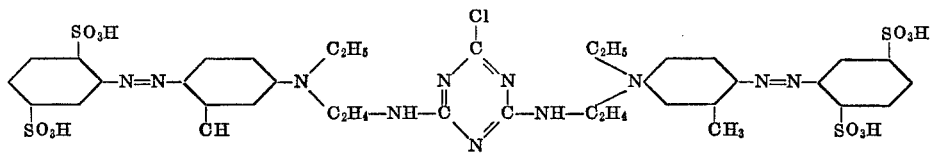

are dissolved in 400 parts of water. While stirring, 28 parts of α,β-dibromopropionyl chloride are dropped in within 30 minutes and the pH value is kept between 6 to 7.5 by additions of sodium hydrogen carbonate. The acylated dyestuff precipitates slowly and is filtered after 1 hour. The precipitate is washed with a 5% solution of sodium chloride and the dyestuff paste so obtained is dried in vacuo at 80–90° C.

A water-soluble, orange-brown powder is obtained, which dyes polyamide from a weakly acetic acid bath a yellow-orange tint having good properties of wet fastness.

When using in place of α,β-dibromopropionyl chloride equivalent amounts of chloroacetyl chloride, acetyl chloride, acrylic acid chloride, trichloroacrylic acid chloride or benzoyl chloride, dyestuffs are obtained which dye polyamide similar shades having good properties of wet fastness.

EXAMPLE 5

44.2 parts of the azo dyestuff of the formula

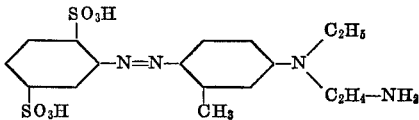

are dissolved in the form of the disodium salt in 500 parts of water. The neutralised solution is cooled to 0° C. by addition of ice and 9.25 parts of finely powdered cyanuric chloride are added. Dilute sodium hydroxide solution is run into the mixture at 0–5° C. with thorough stirring so that the pH value is kept between 6.5 to 7. After about an hour the reaction temperature is raised to 45 to 50° C. within a further hour and the pH value is maintained between 6.5 and 7. The dyestuff of the constitution

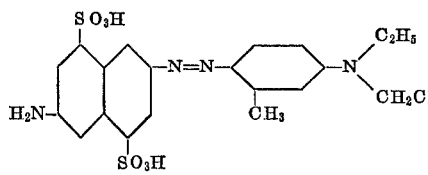 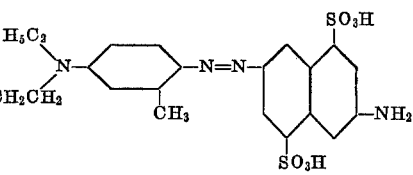

is precipitated after completion of the condensation by addition of sodium chloride, filtered and dried in vacuo. It dyes polyamide fibres yellow tints fast to wetting and light.

We claim:
1. A disazo dyestuff of the Formulae 1a

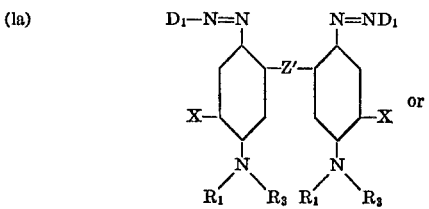

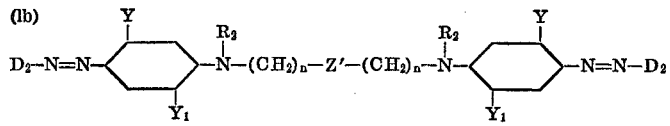

in which $D_1$ and $D_2$ each represents the residue of a diazo component of the benzene or naphthalene series containing at least one and not more than three sulpho groups, X, Y and $Y_1$ each represents hydrogen, trifluoromethyl, lower alkanesulphonyl, lower alkyl, lower alkoxy, phenoxy, chlorine, bromine, benzoylamino or lower alkanoylamino; $R_1$, $R_2$ and $R_3$ each represents hydrogen, lower alkyl or lower alkyl substituted by cyano, hydroxyl, acetyloxy, carbomethoxy, carboethoxy or carbopropoxy; $n=1$, 2 or 3 and $Z'$ represents a bridge member of the formula

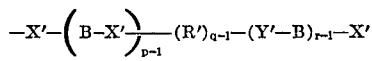

where B represents a —CO—, —SO$_2$— or lower alkylene; $X'$ and $Y'$ each represents —O—, —NR$_4$— wherein $R_4$ is hydrogen or lower alkyl or a direct linkage; $R'$ represents phenylene, toluylene, diphenylene, stilbene or lower alkylene or lower alkylene which is interrupted by oxygen atoms or NR$_4$—; $p$, $q$ and $r=1$ or 2, the sum of $p+q+r$ must be at least 4.

2. A disazo dyestuff as claimed in claim 1, wherein $X'$ and $Y'$ represents —NH—, $R'$ represents phenylene, toluylene or lower alkylene containing 2 to 6 carbon atoms, and the two B, $X'$, $Y'$, $p$, $q$ and $r$ are the same, and in which at least one of the residues $R_2$, $R_1$ and $R_3$ represents ethyl or ethyl substituted in β-position by cyano, hydroxyl, acetyloxy, carbomethoxy, carboethoxy or carbopropoxy as obviously intended.

3. A disazo dyestuff of the Formula 1a as claimed in claim 1

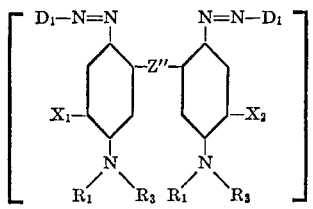

in which X represents hydrogen, methyl or methoxy and $Z'$ is —NH—CO—R'—CO—NH— or

—NH—CO—NH—R'—NHCONH—

4. A disazo dyestuff as claimed in claim 3, wherein X represents hydrogen and $R_1$ and $R_3$ each represents an alkyl containing not more than 4 carbon atoms, or acetyloxy substituted lower alkyl.

5. A disazo dyestuff of the Formula 1b as claimed in claim 1

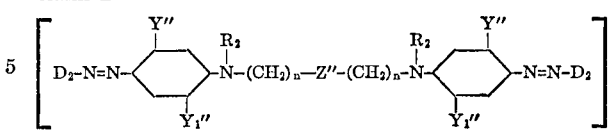

in which Y and $Y_1$ each represents hydrogen, chlorine, lower alkyl, lower alkoxy, benzoylamino or lower alkanoylamino, $Z'$ represents the bridge member of the formula

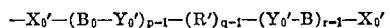

where $B_0$ represents —CO— or lower alkylene; $X_6'$ and $Y_0'$ each represents —O—, —NH— or a direct linkage.

6. A disazo dyestuffs as claimed in claim 5, wherein $R'$ represents phenylene, toluylene or alkylene residue containing 2 to 6 carbon atoms.

7. A disazo dyestuff as claimed in claim 5 wherein $D_2$ represents the residue of a diazo compound of an amine of the formula

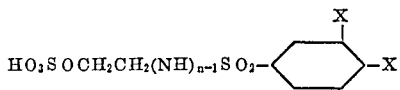

where $n=1$ or 2, one X represents —NH$_2$ and the other —H, —Cl, —CH$_3$ or —OCH$_3$.

8. A disazo dyestuff as claimed in claim 1, wherein $R'$ represents phenylene or toluylene, or an alkylene containing 2 to 6 carbon atoms and the two B, $X'$, $Y'$, $p$, $q$ and $r$ are the same.

9. A disazo dyestuff as claimed in claim 1 that contains in each of the residues of the diazo components a fibre-reactive mono- or dichloro-triazine residue or a fibre-reactive aliphatic carboxylic acid residue containing not more than 3 carbon atoms.

10. A disazo dyestuff as claimed in claim 9, wherein the fibre-reactive residue is chloroacetyl, dibromopropionyl, acryl, bromoacryl or β-sulphatopropionyl residue.

11. The disazo dyestuff as claimed in claim 1 and corresponding to the formula

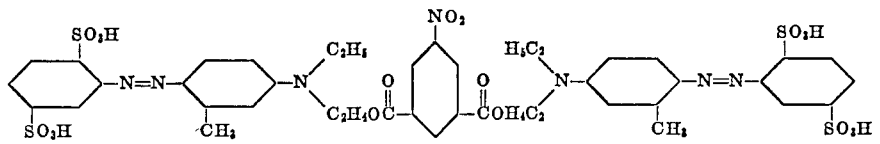

12. The disazo dyestuff as claimed in claim 1 and corresponding to the formula

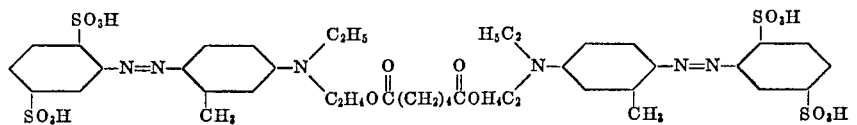

13. The disazo dyestuff as claimed in claim 1 and corresponding to the formula

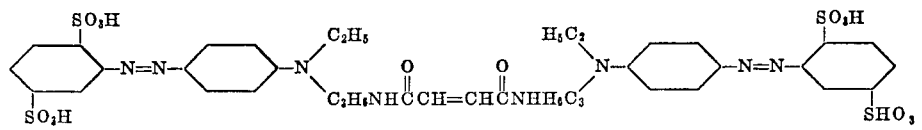

14. The disazo dyestuff as claimed in claim 1 and corresponding to the formula

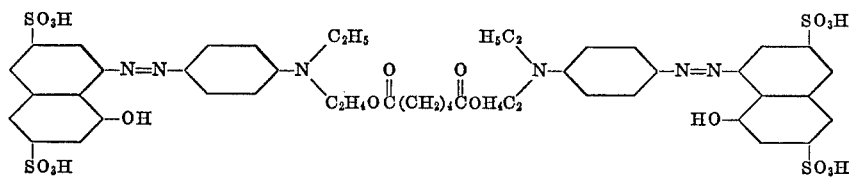

15. The disazo dyestuff as claimed in claim 1 and corresponding to the formula

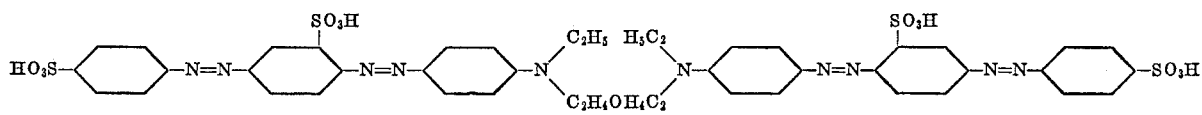

16. The disazo dyestuff as claimed in claim 1 and corresponding to the formula

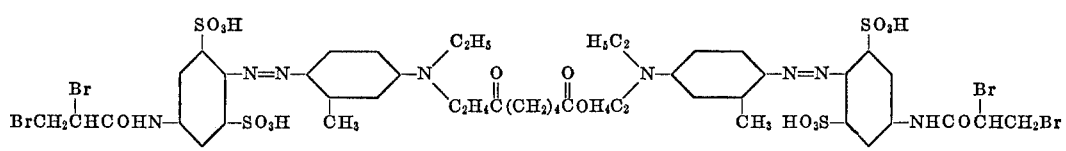

17. The disazo dyestuff as claimed in claim 1 and corresponding to the formula

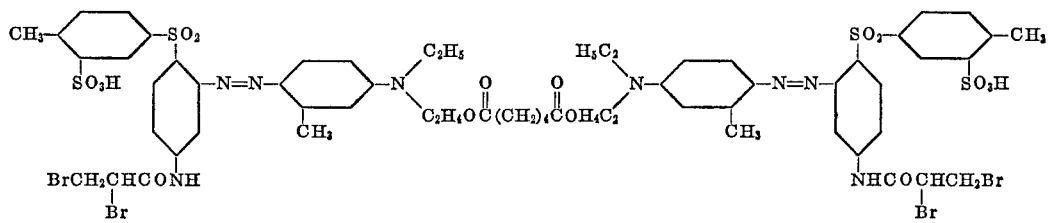

References Cited
UNITED STATES PATENTS

| | | | |
|---|---|---|---|
| 2,734,053 | 2/1956 | Grandjean et al. | 260—147 |
| 2,741,657 | 4/1956 | Schmid et al. | 260—160 |
| 2,813,852 | 11/1957 | Grandjean et al. | 260—144 |
| 2,813,856 | 11/1957 | Steinemann et al. | 260—174 |
| 3,401,158 | 9/1968 | Fisher et al. | 260—158 |

FLOYD D. HIGEL, Primary Examiner

U.S. Cl. X.R.

8—4, 13, 41 R, 41 B, 50; 117—138.8 R, 138.8 D, 142, 144; 260—37 N, 152, 154, 155, 156, 157, 158, 166, 178, 188, 332.2 A, 465 E, 472, 475 PN, 485 G, 490, 553 A, 556 B, 558 A, 562 P, 571

UNITED STATES PATENT OFFICE
CERTIFICATE OF CORRECTION

Patent No. 3,642,764   Dated February 15, 1972

Inventor(s) MONTMOLLIN ET AL

It is certified that error appears in the above-identified patent and that said Letters Patent are hereby corrected as shown below:

Column 26, claim 1, line 56, amend the right side of the first structural formula (1a) to read:

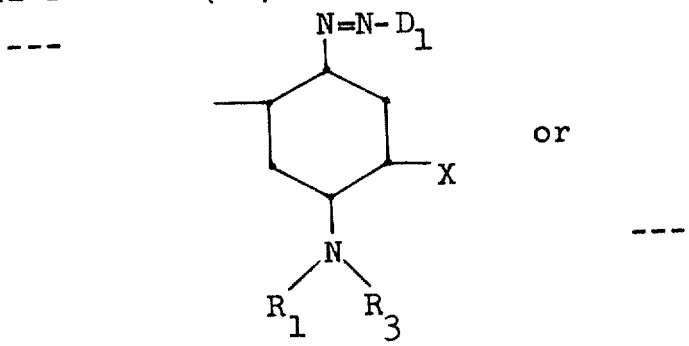   or   ---

Column 27, claim 1, line 7, amend the formula to read:

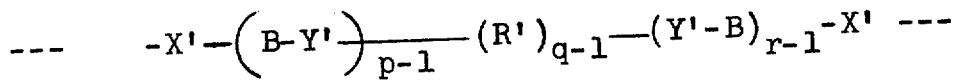

Column 27, claim 3, line 26, amend the right side of the structural formula to read:

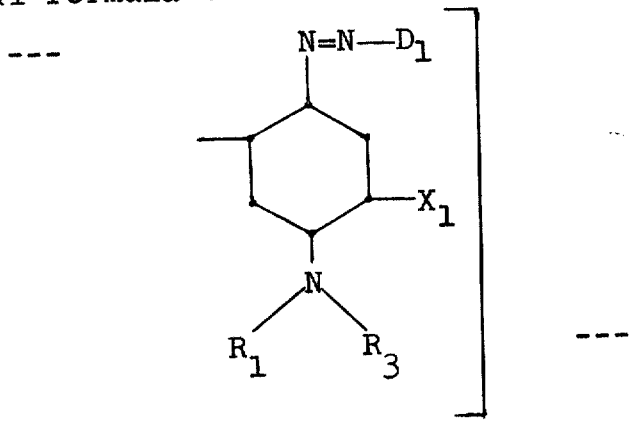   ---

PO-1050
(5/69)

UNITED STATES PATENT OFFICE
CERTIFICATE OF CORRECTION

Patent No. 3,642,764      Dated February 15, 1972

Inventor(s) MONTMOLLIN ET AL

It is certified that error appears in the above-identified patent and that said Letters Patent are hereby corrected as shown below:

Column 27, claim 4, line 40, after "$R_3$ each represents", delete "an".

Column 28, claim 5, line 14, delete "$X_6'$" and substitute --- $X_o'$ ---.

Column 28, claim 6, line 16, delete "dyestuffs" and substitute --- dyestuff ---.

Delete claim 13.

Signed and sealed this 19th day of September 1972.

(SEAL)
Attest:

EDWARD M. FLETCHER, JR.
Attesting Officer

ROBERT GOTTSCHALK
Commissioner of Patents